（12） United States Patent
Benson

(10) Patent No.: US 8,825,208 B1
(45) Date of Patent: Sep. 2, 2014

(54) AUTOMATED CONSTRUCTION MACHINERY AND METHOD

(76) Inventor: Richard Mark Benson, Hyde Park, NY (US)

( * ) Notice: Subject to any disclaimer, the term of this patent is extended or adjusted under 35 U.S.C. 154(b) by 0 days.

(21) Appl. No.: 13/493,997

(22) Filed: Jun. 11, 2012

Related U.S. Application Data

(60) Provisional application No. 61/495,752, filed on Jun. 10, 2011.

(51) Int. Cl.
*E04G 21/22* (2006.01)

(52) U.S. Cl.
USPC ............. 700/245; 700/247; 52/749.14; 901/2

(58) Field of Classification Search
CPC ......... E04G 21/20; E04G 21/22; E04C 2/042; B25J 9/00; G05B 2219/45086
USPC .................. 700/245, 247; 52/749.13, 749.14; 414/10, 931; 901/1, 2
See application file for complete search history.

(56) References Cited

U.S. PATENT DOCUMENTS

| | | | |
|---|---|---|---|
| 3,950,914 A * | 4/1976 | Lowen ...................... | 52/749.14 |
| 5,284,000 A * | 2/1994 | Milne et al. ............... | 52/749.14 |
| 6,370,837 B1 * | 4/2002 | McMahon et al. ......... | 52/749.14 |
| 2009/0038258 A1* | 2/2009 | Pivac et al. ................ | 52/749.14 |
| 2012/0053726 A1* | 3/2012 | Peters et al. ............... | 700/252 |

OTHER PUBLICATIONS

Gambao et al., "Robot assembly system for computer-integrated construction," 2000, Elsevier, Automation in Construction 9, pp. 479-487.*
Pritschow et al., "Technological aspects in the development of a mobile bricklaying robot," 1996, Elsevier, Automation in Construction 5, pp. 3-13.*
Chamberlain et al., "Masonry Construction by an Experimental Robot," Jun. 1992, The 9th International Symposium on Automation and Robotics in Construction.*

* cited by examiner

*Primary Examiner* — Khoi Tran
*Assistant Examiner* — Spencer Patton
(74) *Attorney, Agent, or Firm* — Calhelha & Doyle LLC

(57) ABSTRACT

An automated block or brick construction apparatus is provided by adapting a base transport assembly with a specialized working platform for brick, block and mortar. The working platform houses at least one robotic arm to accurately position mortar and block or brick in place on a wall construction. The working platform is controlled by a 3-D stringless guidance system for positioning vertically, horizontally, and laterally. The robotic arms place and position a block or brick and stage the subsequent blocks or bricks for installation. A first robotic arm can apply mortar onto a wall while a second robotic arm places a concrete masonry unit accurately onto the mortar and also place blocks in position. Application and movement of mortar and blocks are controlled by a programmable central processing unit.

12 Claims, 8 Drawing Sheets

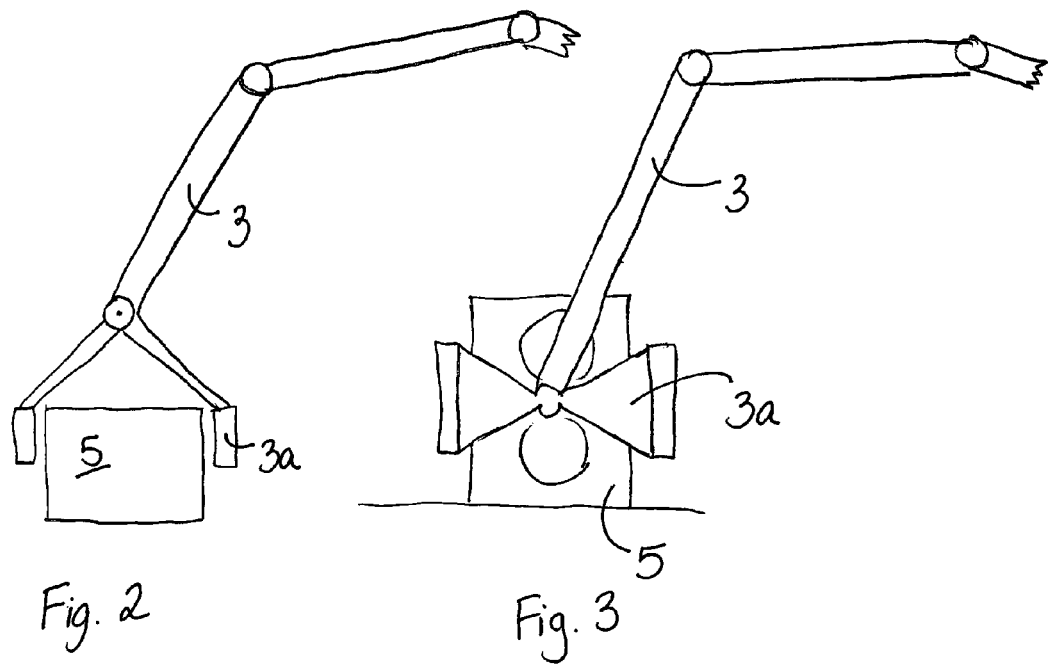

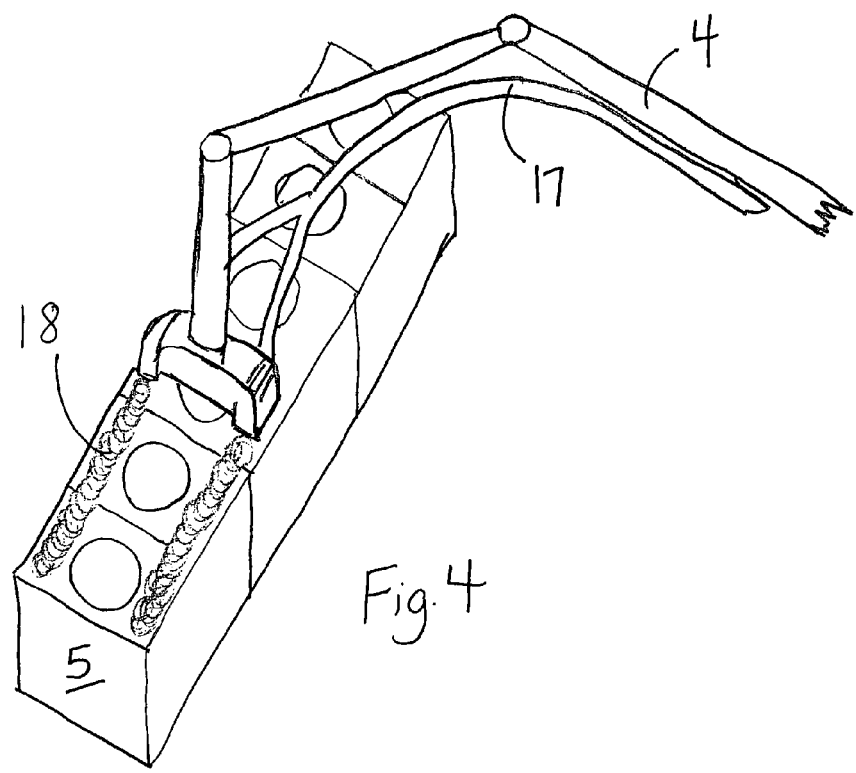

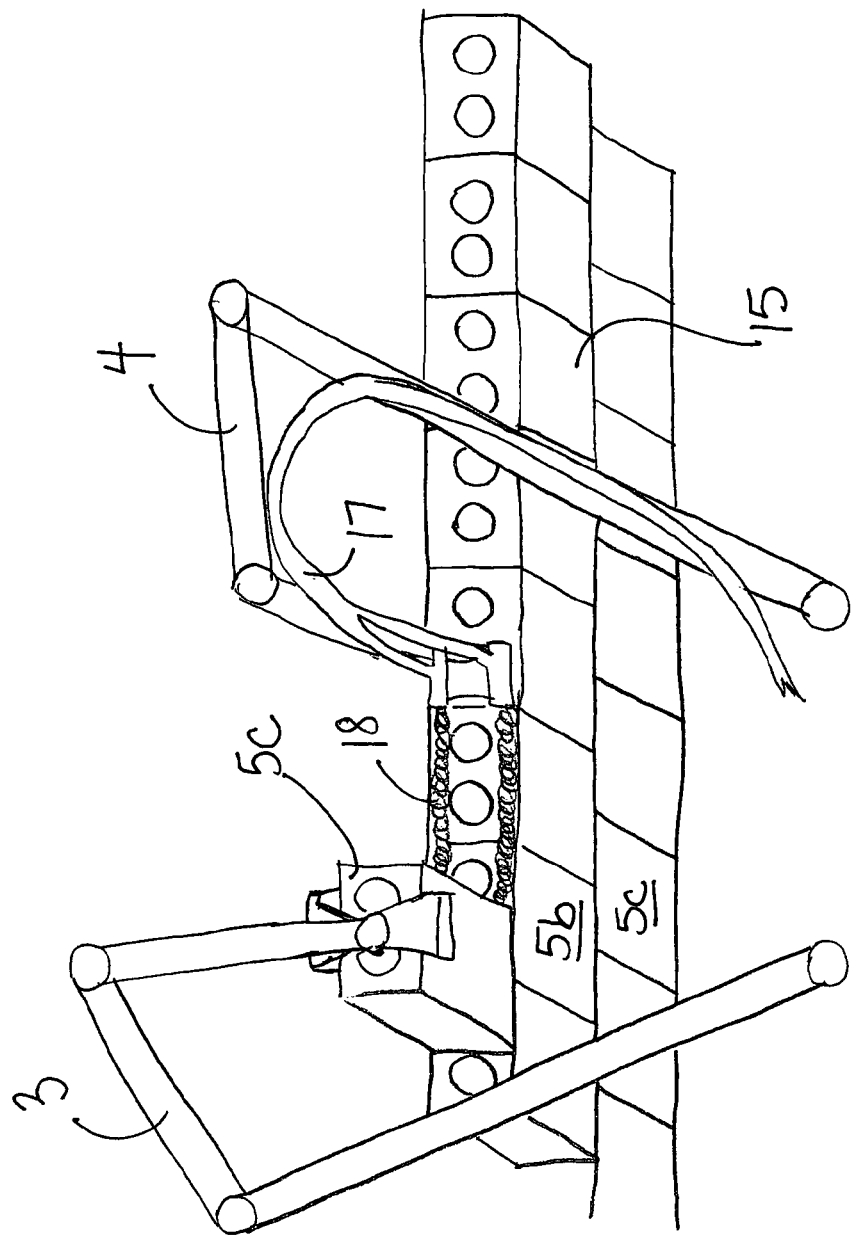

AUTOMATED CONSTRUCTION MACHINERY AND METHOD

CROSS-REFERENCE TO RELATED APPLICATION

This application claims the benefit of provisional application Ser. No. 61/495,752 filed Jun. 10, 2011 which is incorporated herein by reference.

FIELD OF THE INVENTION

The present invention relates to automated construction machinery and improved methods for concrete and masonry block construction applications.

BACKGROUND OF THE INVENTION

Masonry construction methods are both labor and energy intensive while simultaneously requiring great precision for accuracy, efficiency and aesthetics. Furthermore, both worker and building safety concerns require high quality construction standards at all times. Many tools and techniques have been developed to improve various specific aspects of the industry, but have heretofore exhibited shortcomings or deficiencies in one or more of the foregoing areas.

For instance, US Application Publication 2003/0069668 A1 to Zurn discloses a combination asphalt/concrete surface repair machine. The machine is a direction-finding, wheeled, transportable vehicle, which is a self-regulating repair machine, controlled by a central computer. The machine is capable of being attached to and hauled by another faster vehicle (i.e., truck) if necessary. This machine is guided by a positioning device, which uses radar and laser technology to place the machine above each position of the road surface to be repaired. It uses a seismic or radar analyzer technology to determine road surface repair requirements by use of robotic modules within the machine.

Also, US Application Publication 2002/0040234336 A1 to Casters discloses a paving machine arranged to spread and level concrete along a path. The paving machine has a frame assembly, and at least one concrete pressing device carried by the frame assembly. The processing device includes at least two screed elements spanning the width of the frame assembly and which are mutually adjustable in height relative to the frame assembly. The paving machine further includes a control device that positions screed elements relative to the frame assembly. The machine is provided with a computer system with a monitor upon which one or more of the following parameter data can be visualized: the width adjustment of the paving machine; when a concrete path is produced having a roof-shaped profile, in other words, with a surface sloping from the middle towards both lateral edges, data related to the shape of the predetermined roof-shaped profile; the forward speed of the paving machine; the covered distance; the oscillation speed of applied vibration means for vibrating the concrete; the thickness of the concrete path; the visualization of alarm functions; and an indication as the dowel apparatus approaches the end of its travel course.

It will be recognized, however, that the above described paving machines would not provide the block-construction system described in detail herein below.

Neither of the published approaches, provide the safe, energy and man-power efficient and accurate construction apparatus and method disclosed in the subject application, wherein each of the foregoing objects and advantages mentioned above can be achieved. All patents and patent application publications cited herein are incorporated by reference.

SUMMARY OF THE INVENTION

An improved and automated concrete and masonry block construction apparatus is provided. Improved methods for block construction applications are also provided. As used herein, block construction generally refers to masonry blocks or bricks of rectangular shape (parallelepiped), but which may also be square, decorative or exhibit other functional or ornamental elements.

In one embodiment, a working platform is provided using the transport base of a conventional concrete paving machine which has been otherwise stripped of unnecessary paving attachments and accessories. The subject working platform, which is sometimes referred to as a moving platform, holds brick, block and mortar necessary for a construction project. The platform also houses one or more one robotic arms (RAs). The working platform is controlled by a three dimensional stringless guidance system, typically combining a laser and optic sighting system. One effective stringless guidance system is the Leica System described by Gomaco Corporation at www.gomaco.com/resources/leica.html for positioning work objects vertically, horizontally and laterally. Gomaco Corporation also manufactures concrete paving equipment which can be retrofitted to provide the moving platform mentioned above.

Once the working platform is in proper position, the robotic arm accurately places a block or brick as required on a wall construction. In preferred embodiments, the subject system and apparatus eliminates the use and erection of scaffolding, thereby saving additional time, money and labor for many projects. Furthermore, the subject method minimizes safety concerns associated with such scaffolding.

Additional features of the subject system and apparatus include horizontal placement and vertical elevation of the working platform. Positioning of the working platform is accomplished by the 3-D stringless guidance system described above. In typical embodiments, a robotic arm will apply mortar onto a wall and the same or a second robotic arm will place a Concrete Masonry Unit (CMU) accurately onto the mortar in its precise position. Delivery, application and movement of mortar is controlled by a programmable central processing unit which is preferably on the movable platform along with space for a controlling operator. Delivery and application of the CMUs to and on the movable platform also may be controlled by the same central processing unit and operator. A central processing unit in the above description is meant to encompass a programmable computing device with input and output devices such as monitors, keyboards, manual control devices and overrides, as well as interfaces for necessary positioning devices such as a laser sighting device or global positioning system device.

Accordingly, objects of the invention include faster and more accurate installation of construction materials, with less labor costs, as well as a significant reduction or elimination of difficult and labor intensive aspects of masonry construction projects.

These improvements will be appreciated by building construction contractors, designers and engineering and masonry professionals.

The subject improved construction apparatus may be provided in accordance with the descriptions and drawings detailed below.

Other objects, features and advantages of the present invention will be apparent when the detailed descriptions of

BRIEF DESCRIPTION OF THE DRAWINGS

FIG. 2 is an elevation view of a robotic arm placing a concrete masonry unit (CMU).

FIG. 3 is top plan view of a robotic arm placing a concrete masonry unit (CMU).

FIG. 4 is top perspective view of a robotic arm placing one in a series of concrete masonry units.

FIG. 5 is a perspective view of two robotic arms operating on multiple tiers of arrayed concrete masonry units.

DETAILED DESCRIPTION OF THE PREFERRED EMBODIMENTS

Figure 1:
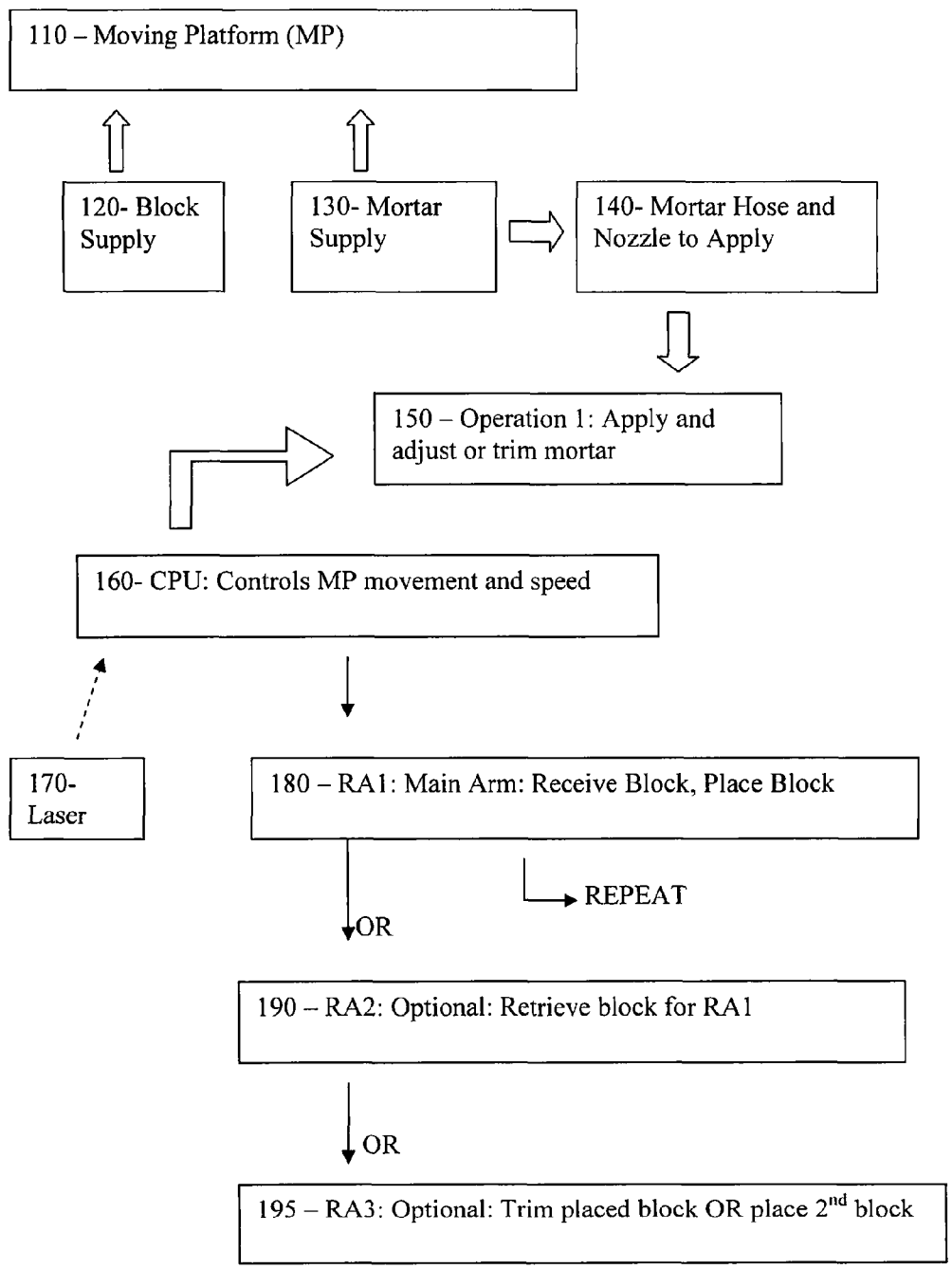
FIG. 1 is a process diagram depicting the subject system.

A masonry block construction apparatus comprising a transport assembly adapted for deployment at a construction project site; a working platform movably attached to the transport assembly; the working platform is configured for travel and adjustment along three independent axes for height adjustment along a vertical face of a construction project wall, horizontal adjustment along the length of the project wall and lateral adjustment of the platform as necessary toward or away from the face of the project wall. The apparatus further comprises a supply for concrete masonry units, each unit supplying a plurality of masonry blocks, and a supply for masonry mortar. The apparatus has at least one robotic arm, having a first configuration to adjustably apply masonry mortar at a desired construction location for engagement with a masonry block to be applied thereupon; a second robotic arm configuration, which may utilize the same or different robotic arm, the second configuration adapted to precisely and adjustably set a masonry block upon such applied mortar at a specified position and thereafter trim excess uncured mortar from the block and construction area. Further the apparatus has a sighting controller having a three dimensional stringless guidance system for vertical, horizontal and lateral positioning of work objects and mortar; a controller for delivery, application and movement of mortar, wherein the controller is a programmable central processing unit which is preferably on the movable platform along with space for a control operator; and storage and delivery modules configured for containment, positioning and application of the concrete masonry blocks to, upon and from the movable platform. These functions are typically controlled by the same central processing unit and operator.

In some embodiments, there will preferably be included a placement tray. This tray is placed at a stationary position which the robotic arm can recognize. The robotic arm picks up a block from the storage module such as a bin or cube and then supplies it to the placement tray and releases it. The tray is on a downward angle and also at either an angle to the right or left as may be desired to supply the block. The block slides on the tray to the lowest point, known precisely to the robotic mechanism. The arm can then pick the block up again at this known position for complete accuracy. The tray typically also has holes for granules (or "crumbs") to fall out and a jet of air may be released to clear the tray.

For trimming, a diamond saw blade may be used to cut off excess block when needed. A 28 inch diameter blade is suitable in this application. The robotic arm will pick up a block from the tray and slide it though the saw blade to cut to size as necessary. (e.g. a 14 inch piece, or a 12 inch piece, etc.).

A mortar tube uses a high pressure hose coming from a mortar mixer to the construction apparatus via a mortar pump and the hose is hooked up to a robotic arm. At the end of the arm the hose is split into a "Y" shape. At the end of the Y are two nozzles which are opened when needed. These nozzles can be adjusted to allow more or less mortar flow. When opened, they release mortar onto blocks at head joints (vertical joints) and bed joints (horizontal joints) before the blocks are set.

Guard rails are attached to the platform where blocks are delivered onto the machine, usually via forklift. The rails are directly behind the robotic arm or arms. These rails are a guide, such that when a cube of block is landed on the machine it is landed in the same place every time and the robotic arm can find a block at the same place.

A string line is a physical or visual straight line used to set up the machine accurately and define a path for the machine to follow. It permits the machine to recognize its location in relation to wall being constructed.

The working platform will move laterally on the transport base, typically in eight inch increments as needed for exact placement of the blocks. It may also turn in a circular direction via a turntable as may be necessary or desired. This permits the robotic arms to work off the rear of the machine, or along the shorter side of the machine.

Preferably, adjustable legs (e.g. telescoping legs) will vertically extend the working platform above the transport assembly base. This will allow for a higher reach of robotic arms, facilitating the building of higher walls. Optionally, these legs can also be placed at different positions on and around machine. Other telescoping leg arrangements may be utilized, such as hydraulic or pneumatic systems and those using gear and teeth arrangements.

The machine transport base typically is powered by a diesel motor and moved along by tracks (crawler tracks). Wheels may be utilized in other embodiments. Most embodiments will have a work station for a worker to control operations. This person has control of both the programmable computer station and operation of machine.

Robotic arms are powered by electricity and air pumps. They are controlled by controllers and a programmable computer based upon input from visual and other sensors as well as manual input from a controlling operator. Accuracy to a tenth of a millimeter is typically expected.

FIG. 1 schematically depicts a process diagram showing a number of important features of the subject system 100 and the inter-relationships among them. A work platform or moving platform (MP) 110 having powered wheels or treads for motion along a masonry construction area, it may also be adjustable in height above the construction area. The moving platform is configured with a CMU block supply 120 in the form of hoppers, bins, pallets or the like. The blocks are typically stacked in orderly fashion but the apparatus can handle random blocks as well. The moving platform has a mortar supply 130, handling mortar from a mixer, hose 140 or other supply source. Mortar is applied 150 via hose and nozzle by one or more robotic arms 180 (e.g. RA1) and the same or a different robotic arm will precisely place a CMU in its intended position. Positioning of the mortar and CMU is a programmable controller using a central processing unit computer (CPU) 160 capable of controlling and adjusting movement and speed of the platform, robotic arm(s), height adjustments and the like. The CPU receives placement input from a laser guided optical sighting mechanism 170 and provides movement instructions to all or portions of the construction apparatus. Operator control overrides are also contemplated. In one embodiment, a single robotic arm can apply mortar, receive and place a CMU, trim excess mortar if necessary and then repeat the process. In other embodiments, additional robotic arms can sub-divide or duplicate the work in a series of steps. A further embodiment has a robotic arm with a trowel-like mechanism to trim and adjust the mortar 195.

FIGS. 2 and 3 depict robotic arm 3 placing and adjusting a concrete masonry unit (CMU) 5. Arm gripper 3a is indicated as well.

In FIG. 4, mortar 18 is slathered to an appropriate depth upon the top of a course of concrete masonry units 5 (CMUs) prior to the subsequent placement of a second course of CMUs thereon. In this view, robotic arm 4 has mortar supply hose 17 indicated.

FIG. 5 depicts robotic arm 4 applying mortar 18 via hose and nozzle 17 upon lower course 15 of a wall construction, whereupon a second robotic arm 3 places CMU block 5c upon mortar 18 applied upon CMU block 5b.

Figure 6:
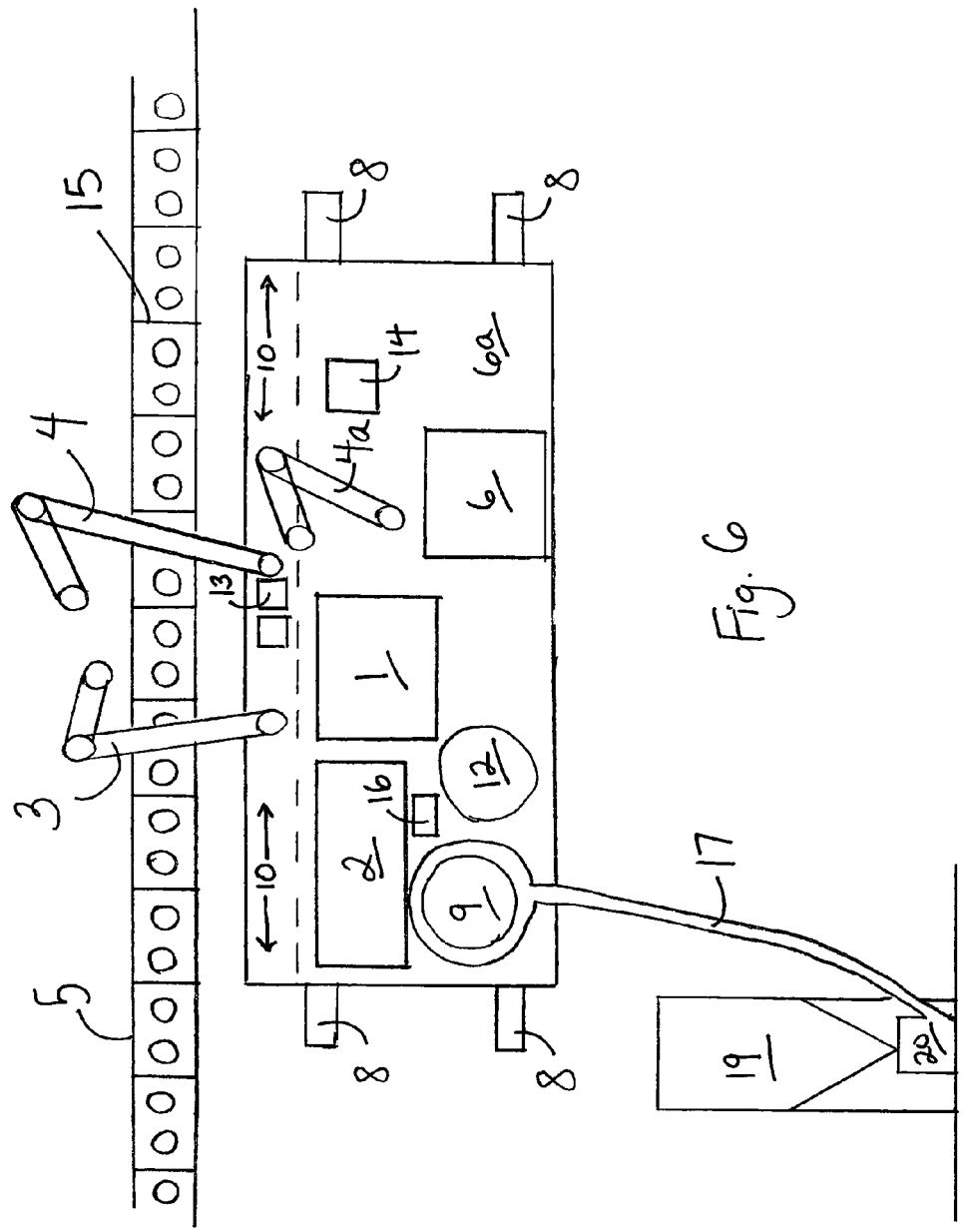
FIG. 6 is a top plan schematic view of the apparatus of the subject invention.

In FIG. 6, depicted is moving platform 1 upon base 6a having transport means 8 (wheels or tracks), CMU supply hopper 6, mortar supply hoppers and apparatus 9, 12, 17 and 19-20, robotic arms 3 and 4 operating upon blocks 5 and masonry wall 15.

Figure 7:
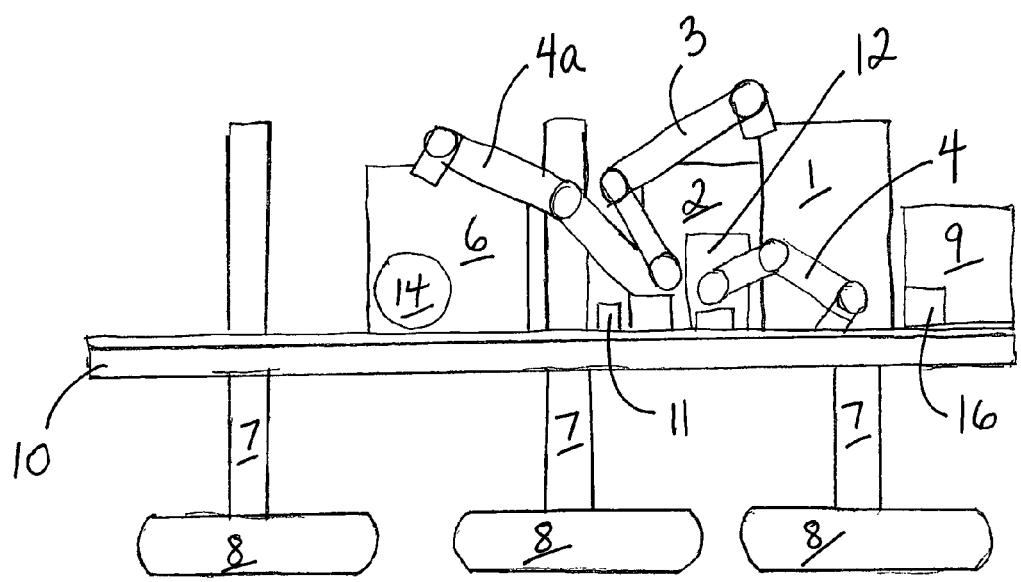
FIG. 7 is a side elevation view of an embodiment of the subject invention.

FIG. 7 depicts an embodiment of the subject apparatus. Adjustable height platform 10, supported by adjustable legs or columns 7 and transport means 8. Seen in this view are robotic arms 3, 4 and 4a. Also depicted are supply modules 6, 9, 14 and control modules 1, 2 and 11.

Figure 8:
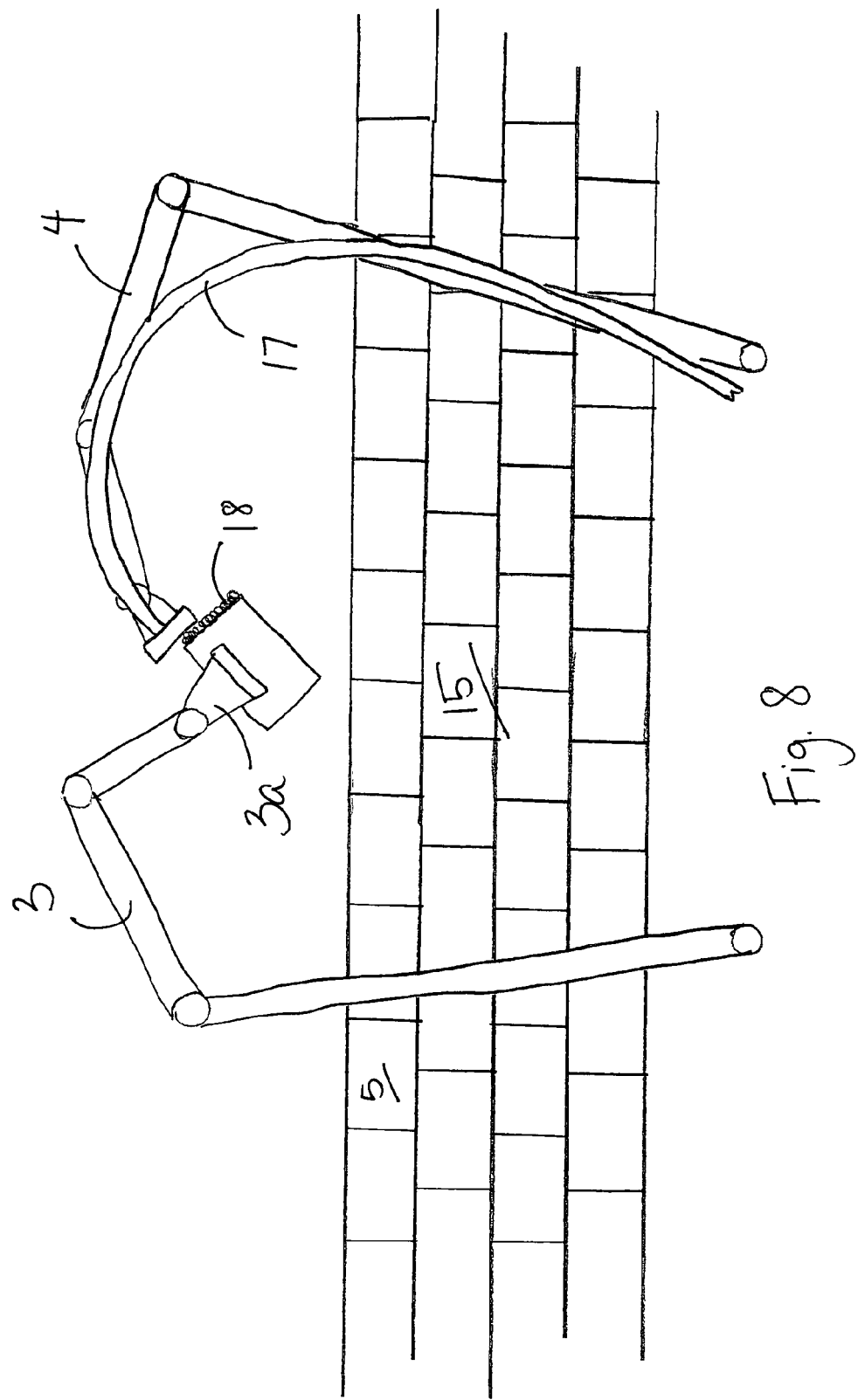
FIG. 8 is side elevation view of an embodiment of the subject invention.

FIG. 8 depicts robotic arm 3 holding a CMU block via gripper 3a for application of mortar 18 by robotic arm 4, prior to placement of the CMU by robotic arm 3 upon masonry wall 15. Individual blocks are indicated via reference 5.

Figure 9:
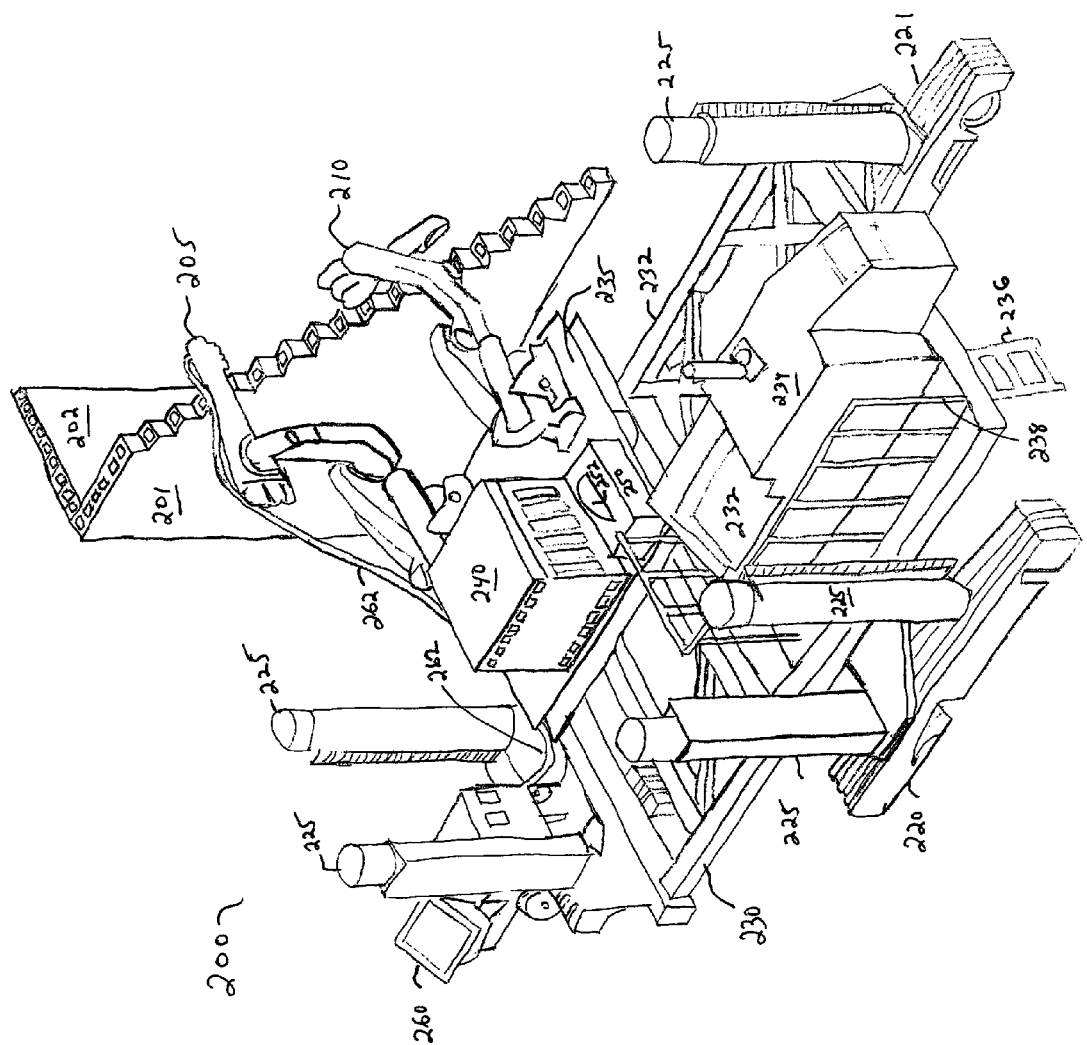
FIG. 9 is a perspective schematic view of another embodiment of the subject invention.

FIG. 9 depicts an embodiment of a movement platform which may be used in combination with control and guidance apparatus, one or more robotic arms and the mortar and CMU supply systems in a masonry construction system.

In a preferred embodiment, a conventional Gomaco Corporation paving machine (for example, the Commander III, GT3200) is modified to eliminate its standard concrete paving attachments, such as molds and conveyor charging systems, etc. The modified machine setup provides a transport base assembly which will accept a working platform, robotic arms, block, mortar (and saw, if necessary) for utilization in the subject system. See for example, Gomaco Commander III and GT3200 product literature.

As a preferred embodiment of the subject apparatus, the system may be described referring particularly to FIG. 9 wherein reference 232 is a Computer Control System and Work Station for the Operator. This is the programmable computer that controls the machine and its operation. This is also a work station for the operator.

Reference no. 234 is the Engine (Power) System, typically a diesel engine that supplies all power for the operation of the machine.

Reference no. 205 is the Main Robotic Arm. This is the Robotic Arm (RA) that places the block or the brick onto the wall.

Reference no. 210 is the Mortar Dispensing Robotic Arm. This robotic arm dispenses mortar on bed (horizontal) and head (vertical) joints. It will also tool joints to a consistent, smooth, concave shape (using a jointer or other trowel-like accessories). It should be understood that a separate arm may not be necessary to perform the above described steps in sequence.

Optionally, a De-Cubing Robotic Arm may be used to take block or brick, one by one, off the cubes as they are delivered to the job site. It will place them at a holding platform. This arm also holds brick and block at a saw 252, to be cut if needed. Again, multiple arms are desirable but not always necessary.

Reference no. 240 is a Cube of Masonry Units. These are brick and block stacked into cubes by the manufacturer and delivered to job sites.

Reference nos. 225 indicates Vertical Telescoping Legs. These legs will telescope up or down as needed to reach different parts of the wall 201.

Reference nos. 220 and 221 indicate the Tracks for Movement of the machine. These are usually tractor-type tracks that move the machine through rough and muddy terrain. In other embodiments, wheels may be used.

Reference no. 260 is a Mortar Tank with Auger inside. This is a tank that holds the mortar for the brick and block. A typical volume for such tank would be 100 gallons. It has an auger as well as a water inlet. The auger keeps the mortar from stiffening and the water inlet allows added water to loosen mortar if necessary.

Reference nos. 232 are Rails which carry RA 205 and RA 210 horizontally. These rails allow the arms to move from side to side for more reach as needed. If necessary, vertical movement can be permitted.

A Water Tank may be used to hold water for the mortar tank as needed and also is used to clean the machine. The water is pressurized.

A holding platform for odd MU's (Half pieces, etc.) may be provided. This is another platform to hold odd shaped pieces such as factory halves.

Reference no. 250 is a saw for cutting Masonry Units. This is a stationary saw that will cut masonry units as needed. A robotic arm will hold a block to the saw blade as it is cut, then place in position for installation.

Reference nos. 201 and 202 refer to perpendicular walls constructed with the subject apparatus.

Reference no. 263 is a mortar pump and hose. This pump will transport mortar from the mortar tank to the nozzle at robotic arm 210.

Reference no. 262 is a mortar hose. This is the hose that mortar is pumped through to get to the nozzle at robotic arm #4.

In other views, reference no. 18 is the mortar. Conventional masonry mortar is used for blocks or bricks.

Also utilized are a mortar hopper which holds mortar before water is added and mixed, a mixer for mixing the water and mortar with a door which may be a conventional container closure.

The subject apparatus may be provided in the following manner. Using the base of a Gomaco concrete paving machine, stripped of conventional attachments, attach a masonry construction working platform. The platform will hold brick, block and mortar. The platform also houses one or more robotic arm(s). The platform is controlled by a 3D stringless guidance system (Leica System) for positioning the apparatus and the CMUs vertically, horizontally, laterally etc. Once the platform is in a proper position, the robotic arm could accurately place block or brick in the wall. The machine will be capable of placing material within +/−1 mm, with less labor than is necessary today.

Wall, wall section or building dimensions are programmed into the computer, the computer calculates where the windows, doors and other fixtures will be located. If any CMU pieces need to be cut, it will provide the specifications. All block placement (and cuts if needed) will be calculated by the programmable computer.

There is a pause button for the operator to stop the machine when needed. The Leica 3D stringless guidance system will identify exactly where the platform is at all times and guide it to the next proper position. This process also will be controlled by the computer controller. When the computer has all the above information it directs the robotic arms to place the CMU's (accounting for height, distance, depth, pieces, etc).

In a typical embodiment, the CMU's are delivered to the job site in cubes on pallets. These are loaded on to the platform via forklift. A variety of robotic arms (RA) numbered RA1-RA5 are utilized.

RA2 will de-cube CMU's one at a time. It will place them on a shelf where RA3 will pick up a CMU. The mortar will be loaded on the platform via hose or grout hose into a cylindrical tank. Mortar can be tempered in a tank by an auger as needed. RA1 will dispense mortar on wall bed joint and then on head of CMU when CMU is picked up by RA3. RA3 will pick up a CMU off the holding platform that has been delivered by RA2. RA3 will tilt the CMU up at forty-five degrees so RA1 can apply a head joint. After the head joint is applied by RA1, RA3 will place it on wall at the correct location as directed by the computer (and verified by the Leica guidance system). If the next CMU needs to be cut, RA2 will place it at the saw and it will be cut to proper length. Saw operation is also controlled by computer. If no cut is needed, the previous step is repeated. When a section of wall is incomplete in area where RA's can reach, the platform will move horizontally or vertically and the operator will have the option to direct the machine as to which direction to proceed. It may be possible to complete the task with one RA. Multiple RAs may have different grippers. Typically, RA1 will have two nozzles at the end of the arm to allow mortar to be dispensed on head and bed of joints. RA2 and RA3 will have grippers to squeeze CMU's held for placement.

Example 1

A 200 feet by 400 feet rectangular building having control joints at 20 foot centers is constructed in the following manner.

1) Building dimensions are programmed into a computer.
2) A 3-D stringless guidance system (e.g. Leica system) is set and input offset points and bench marks are recorded.
3) The subject construction apparatus is positioned and set-up with CMU's and mortar. A typical load for each may be 100 blocks or 500 bricks per cube (8 feet cubed). Typical blocks may be 8 in.×8 in.×16 in.
4) To load the machine:
   Mortar is mixed at a mixer and pumped into a tank that holds the prepared mortar. The tank has an auger and a water inlet to temper the mortar, keeping the mortar workable. A typical load of mortar may be 25 to 100 gallons
   CMU's are loaded on machine by forklift at the designated place.
5) The apparatus starts to lay the block. There will be one or more robotic arms to do this job.
   One arm applies mortar to head and bed joints of a CMU as it is set.
   Another arm will take a CMU from its preloaded cube and place it where a third arm can pick it up. This arm could also put block where a saw could cut it if necessary and then place it where the third arm can pick it up for placement.
   A third arm can pick up the block, move it at a forty-five degree angle where another arm will place mortar on the head of the CMU, then the third arm will set the CMU into place on the wall.
6) The programmable control computer controls all phases of the operation, including the movement of robotic arm(s) which places the CMU or brick, the Leica guidance system, which controls height, distance and depth placement, the building dimensions, windows, doors, cut block pieces, control joints, etc., and the masonry saw. However, at any time, an operator can stop operations via a pause button.
7) The machine platform rises or lowers vertically as necessary. It will also move left to right horizontally as necessary. Vertical movement is facilitated by telescopic legs.

The invention now being fully described, it will be apparent to one of ordinary skill in the art that many changes and modifications can be made thereto without departing from the spirit or scope of the invention set forth herein.

What is claimed as new and desired to be protected by Letters patent of the United States is:

1. A masonry block construction apparatus comprising:
   a. a transport assembly adapted for deployment at a block construction project site;
   b. a working platform movably attached to the transport assembly; wherein the working platform is configured for travel and adjustment along three independent axes for height adjustment along a vertical face of a construction project wall, horizontal adjustment along the length of the project wall and lateral adjustment of the platform as necessary toward or away from the face of the project wall;
   c. a supply of masonry blocks;
   d. a supply of masonry mortar;
   e. at least one robotic arm, having a first configuration to adjustably apply masonry mortar at a desired construction location for engagement with a masonry block to be applied thereupon;
   f. a second robotic arm configuration, which may utilize the same or different robotic arm, the second configuration adapted to adjustably set a masonry block upon such applied mortar at a specified position and thereafter trim excess uncured mortar from the block and construction area;
   g. a sighting controller having a three dimensional stringless guidance system for vertical, horizontal and lateral positioning of work objects and mortar;
   h. one or more mortar delivery modules having a mortar tube coming from a mortar mixer and mortar pump for delivery, movement and application of mortar, wherein the one or more mortar delivery modules are controlled by a programmable central processing unit which is on the movable platform along with space for a controlling operator; and
   i. one or more masonry block delivery and application modules having a storage bin for delivery and application of the masonry blocks to and on the movable platform, wherein the one or more masonry block delivery and application modules are controlled by the same or a different central processing unit and operator.

2. The apparatus of claim 1 wherein the block construction project is a masonry wall.

3. The apparatus of claim 1 further comprising a laser and optical sighting system.

4. The apparatus of claim 1 wherein the moving platform holds and conveys brick, block and mortar necessary for construction of a masonry wall.

5. The apparatus of claim 1 wherein at least one robotic arm accurately places a block or a brick as required on a wall construction.

6. The apparatus of claim 1 further comprising a guidance module for positioning work objects vertically, horizontally and laterally.

7. The apparatus of claim 1 wherein mortar is supplied by pump, hose and application nozzle.

8. The apparatus of claim 1 wherein the supply for masonry mortar may be by means of hopper or bin storage containers or by supply hose apparatus.

9. The apparatus of claim 1 wherein the supply for concrete masonry blocks may comprise a hopper, bin, pallet or randomized selection of blocks.

10. The apparatus of claim 1 wherein block construction generally refers to masonry blocks or bricks of rectangular shape but which may also be square, decorative or exhibit other functional or ornamental elements.

11. The apparatus of claim 1 wherein one of the central processing units comprises one or more of a programmable computing device with input and output devices, monitors, keyboards, manual control devices, overrides, and sensors and interfaces for necessary positioning devices, including a laser sighting device or global positioning system device.

12. The apparatus of claim 1 wherein the transport assembly utilizes powered wheels or tracks.

* * * * *